United States Patent
Cho et al.

(10) Patent No.: US 10,367,199 B2
(45) Date of Patent: Jul. 30, 2019

(54) CATHODE ACTIVE MATERIAL, LITHIUM SECONDARY BATTERY HAVING SAME, AND METHOD FOR PREPARING SAME

(71) Applicant: KOREA ELECTRONICS TECHNOLOGY INSTITUTE, Seongnam-si, Gyeonggi-do (KR)

(72) Inventors: Woosuk Cho, Seongnam-si (KR); Jeomsoo Kim, Hwaseong-si (KR); Junho Song, Seongnam-si (KR); Taeeun Yim, Seoul (KR); Sanggil Woo, Yongin-si (KR); Youngjun Kim, Seongnam-si (KR); Kowoon Lee, Seongnam-si (KR)

(73) Assignee: Korea Electronics Technology Institute, Gyeonggi-Do (KR)

(*) Notice: Subject to any disclaimer, the term of this patent is extended or adjusted under 35 U.S.C. 154(b) by 289 days.

(21) Appl. No.: 15/123,618

(22) PCT Filed: Sep. 12, 2014

(86) PCT No.: PCT/KR2014/008501
§ 371 (c)(1),
(2) Date: Sep. 2, 2016

(87) PCT Pub. No.: WO2015/133692
PCT Pub. Date: Sep. 11, 2015

(65) Prior Publication Data
US 2017/0077514 A1  Mar. 16, 2017

(30) Foreign Application Priority Data
Mar. 5, 2014 (KR) .................. 10-2014-0026138

(51) Int. Cl.
| | | |
|---|---|---|
| H01M 4/525 | (2010.01) | |
| H01M 4/485 | (2010.01) | |
| C01G 53/00 | (2006.01) | |
| C01G 23/047 | (2006.01) | |
| H01M 4/505 | (2010.01) | |
| H01M 10/0525 | (2010.01) | |
| H01M 10/052 | (2010.01) | |
| H01M 4/02 | (2006.01) | |

(52) U.S. Cl.
CPC .......... *H01M 4/525* (2013.01); *C01G 23/047* (2013.01); *C01G 53/006* (2013.01); *C01G 53/50* (2013.01); *H01M 4/485* (2013.01); *H01M 4/505* (2013.01); *H01M 10/0525* (2013.01); *C01P 2002/72* (2013.01); *C01P 2002/85* (2013.01); *C01P 2004/03* (2013.01); *C01P 2004/84* (2013.01); *C01P 2006/40* (2013.01); *H01M 10/052* (2013.01); *H01M 2004/028* (2013.01)

(58) Field of Classification Search
CPC ...... H01M 4/525; H01M 4/505; H01M 4/485; H01M 10/0525; H01M 10/052; H01M 2004/028; C01G 23/047; C01G 53/006; C01G 53/50; C01P 2004/84; C01P 2006/40
See application file for complete search history.

(56) References Cited

U.S. PATENT DOCUMENTS

| 7,473,493 B2 | 1/2009 | Cho et al. |
| 2003/0211391 A1 | 11/2003 | Cho et al. |
| 2013/0108926 A1 | 5/2013 | Kim et al. |
| 2014/0045067 A1 | 2/2014 | Cho et al. |

FOREIGN PATENT DOCUMENTS

| JP | 2006-278341 | 10/2006 |
| JP | 2012-028163 A | 2/2012 |
| KR | 10-0437339 | 6/2004 |
| KR | 10-0815583 | 3/2008 |

(Continued)

OTHER PUBLICATIONS

Cho, et al., 2010, "$LiNi_{0.8}Co_{0.15}Al_{0.05}O_2$ cathode materials prepared by $TiO_2$ nanoparticle coatings on $Ni_{0.8}Co_{0.15}Al_{0.05}(OH)_2$ precursors," *Electrochimica Acta*, 56:333-339.

(Continued)

*Primary Examiner* — Laura Weiner
(74) *Attorney, Agent, or Firm* — Knobbe, Martens, Olson & Bear, LLP

(57) ABSTRACT

The present invention relates to a cathode active material, a lithium secondary battery having the same, and a method for preparing the same, and the purpose of the present invention is to provide battery properties and thermal stability under a high temperature environment even if the Ni content of M in $LiMO_2$(M=Ni, Co, Ti, Zr, etc.) of layered oxide is increased to 65% or more. The present invention provides a cathode active material for a lithium secondary battery which is represented by chemical formula 1 below and is obtained by substituting a part of Ni, Co and Mn for a dissimilar metal (M) through heat treatment with a lithium source after coating the dissimilar metal (M) on the surface of a transition metal precursor comprising Ni, Co and Mn.

$LiNi_aCo_bMn_cM_dO_2$  [Chemical Formula 1]

($0.6 < a \leq 0.9$, $0 < d \leq 0.1$, $a+b+c+d=1$, M represents at least one metal element selected from the group consisting of Ti, Al, Mg, Fe, Cu, Ag, Ca, Na, K, In, Ga, Ge, V, Mo, Nb, Si and Zr.).

10 Claims, 10 Drawing Sheets

(56) References Cited

FOREIGN PATENT DOCUMENTS

| KR | 10-2010-0056106 | 11/2008 |
| KR | 10-2010-0056106 | 5/2010 |
| KR | 10-1166334 | 7/2012 |
| KR | 10-2012-0121235 | 11/2012 |
| KR | 10-2013-0046810 | 5/2013 |
| WO | WO 2010/147179 A1 | 12/2010 |

OTHER PUBLICATIONS

Ding, et al., 2008 "Synthesis and electrochemical properties of layered $Li[Ni_{1/3}Co_{1/3}Mn_{1/3}]_{0.96}Ti_{0.04}O_{1.96}F_{0.04}$ as cathode material for lithium-ion batteries," *Journal of Alloys and Compounds,* 456:344-347.

Notice of Allowance dated Jun. 3, 2016 for Korean App. No. 10-2014-0026138 filed Mar. 5, 2014, Korean Intellectual Property Office.

International Search Report dated Dec. 18, 2014 for International Application No. PCT/KR2014/008501 filed Sep. 12, 2014.

Notification of Reasons for Refusal mailed by Japan Patent Office dated Jul. 10, 2017 in the corresponding Japanese patent application No. 2016-554186.

CATHODE ACTIVE MATERIAL, LITHIUM SECONDARY BATTERY HAVING SAME, AND METHOD FOR PREPARING SAME

TECHNICAL FIELD

The present invention relates to a lithium secondary battery and a method for preparing the same, and more particularly, to a Ni-rich cathode active material in which a Ni content of M in $LiMO_2$ (M=Ni, Co, Ti, Zr, etc.) of a layered oxide is greater than or equal to 65%, and which has improved electrochemical properties and thermal stability by substituting a small amount of a dissimilar metal at a position of M, a lithium secondary battery having the same, and a method for preparing the same.

BACKGROUND ART

Among cathode active materials for lithium secondary batteries, a lithium cobalt oxide having a layered structure, such as $LiCoO_2$, is the most commonly used cathode material. Lithium cobalt oxide has a problem in that Co is very expensive and toxic, and also has a problem in that it has poor structural stability caused by phase transformation due to lithium deintercalation during charging.

To solve these problems, $LiNi_xCo_yMn_zO_2$ (x+y+z=1) having a reduced content of Co and including Ni, Co, and Mn has been proposed, and NCM523 has been used for a commercial purpose. Here, N, C and M of the "NCM523" refer to Ni, Co, and Mn, respectively, and 523 refers to contents of Ni, Co, and Mn, respectively. That is, "NCM523" refers to "$LiNi_{0.5}Co_{0.2}Mn_{0.3}O_2$."

Recently, materials such as NCM622 in which the content of Ni exceeds 50% have been commercialized due to a current demand for higher energy density, but have a limitation of realizing a high energy density required for electric cars by manufacturers.

PRIOR-ART DOCUMENTS

Patent Documents

Korean Registered Patent Publication No. 0815583 (registered on Mar. 14, 2008)
Korean Registered Patent Publication No. 1166334 (registered on Jul. 11, 2012)

DISCLOSURE

Technical Problem

Therefore, materials in which the content of Ni is greater than or equal to 65%, for example, NCM materials (NCM7 compositions), are being actively developed to realize a high capacity.

However, degradation of battery properties caused by a decrease in structural stability due to an increase in the Ni content, particularly, deterioration of battery properties and a decrease in thermal stability under a high-temperature environment, may become severe, resulting in delayed commercialization of batteries.

Therefore, it is an aspect of the present invention to provide a cathode active material capable of providing structural stability to improve battery properties even when the Ni content is increased to 65% or more, a lithium secondary battery having the same, and a method for preparing the same.

It is another aspect of the present invention to provide a cathode active material capable of being commercialized since battery properties and thermal stability under a high-temperature environment are improved even when the Ni content is increased to 65% or more, a lithium secondary battery having the same, and a method for preparing the same.

Technical Solution

To solve the problems, the present invention provides a cathode active material for lithium secondary batteries which is represented by Chemical Formula 1 below and is obtained by coating a dissimilar metal M on a surface of a transition metal precursor including Ni, Co and Mn and then heat-treating the transition metal precursor together with a lithium source so that a portion of the Ni, Co and Mn is substituted with the dissimilar metal M:

$$LiNi_aCo_bMn_cM_dO_2 \qquad \text{[Chemical Formula 1]}$$

wherein $0.6<a\le 0.9$, $0<d\le 0.1$, $a+b+c+d=1$, and M represents at least one metal element selected from the group consisting of Ti, Al, Mg, Fe, Cu, Ag, Ca, Na, K, In, Ga, Ge, V, Mo, Nb, Si, and Zr.

In the cathode active material according to the present invention, the transition metal precursor may include a nickel-based transition metal hydroxide or a nickel-based transition metal carbonate prepared by a coprecipitation method.

In the cathode active material according to the present invention, the content (a) of Ni in Chemical Formula 1 may be greater than or equal to 0.65.

In the cathode active material according to the present invention, the dissimilar metal may be Ti.

Also, the present invention provides a lithium secondary battery including a cathode active material which is represented by Chemical Formula 1 below and is obtained by coating a dissimilar metal M on a surface of a transition metal precursor including Ni, Co and Mn and then heat-treating the transition metal precursor together with a lithium source so that a portion of the Ni, Co and Mn is substituted with the dissimilar metal M.

In the lithium secondary battery according to the present invention, the cathode active material may have an exothermic temperature peak observed at 275° C. or more, as evaluated by differential scanning calorimetry (DSC) when the lithium secondary battery is charged to 4.3 V.

Further, the present invention provides a method for preparing a cathode active material for lithium secondary batteries, which includes coating a dissimilar metal compound on a surface of a transition metal precursor including Ni, Co and Mn by adding the transition metal precursor to a dissimilar metal M compound coating solution and stirring and drying the resulting mixture, and preparing a cathode active material represented by Chemical Formula 1 above by heat-treating the transition metal precursor coated with the dissimilar metal compound together with a lithium source so that a portion of the Ni, Co and Mn is substituted with the dissimilar metal M.

In the method for preparing a cathode active material according to the present invention, the coating may include preparing a Ti compound coating solution including at least one Ti compound selected from the group consisting of a nanosized Ti oxide and a precursor thereof, and coating the Ti compound on a surface of a transition metal precursor by adding the transition metal precursor to the Ti compound coating solution and stirring and drying the resulting mixture.

In the method for preparing a cathode active material according to the present invention, the Ti compound may be included at a content of 0.1 to 5% by weight, based on the weight of the transition metal precursor.

Also, in the method for preparing a cathode active material according to the present invention, the transition metal precursor may be represented by Chemical Formula 2 below:

$Ni_aCo_bMn_cO_2$ [Chemical Formula 2]

wherein $0.6<a\leq0.9$, and $a+b+c=1$.

Advantageous Effects

According to the present invention, when a small amount of a dissimilar metal M is substituted in a Ni-rich cathode active material, the cathode active material may have improved battery properties since structural stability is offered to the Ni-rich cathode active material even when the Ni content is increased to 65% or more. That is, when a dissimilar metal M is coated on a surface of a transition metal precursor including Ni, Co and Mn, and the transition metal precursor is then heat-treated so that a portion of the Ni, Co and Mn is substituted with the dissimilar metal M, the cathode active material may have improved battery properties and thermal stability under a high-temperature environment even when the Ni content in the cathode active material is increased to 65% or more.

As described above, the cathode active material has improved battery properties and thermal stability under a high-temperature environment. That is, from the fact that the cathode active material according to the present invention has a temperature increasing at a main exothermic peak and an exothermic temperature peak observed at 275° C. or more in a DSC evaluation, it can be seen that thermal stability is remarkably improved and particle strength is remarkably enhanced.

Also, a method for preparing cathode active material capable of easily substituting a residue of the transition metal with the dissimilar metal may be provided, which includes coating a dissimilar metal compound on a surface of a transition metal precursor prepared by a coprecipitation method by adding the transition metal precursor to a dissimilar metal compound coating solution and stirring and drying the resulting mixture, and then heat-treating the transition metal precursor coated with the dissimilar metal compound together with a lithium source.

Further, the present invention may provide a cathode active material for lithium secondary batteries, which has a high degree of uniformity, using a process of dipping a transition metal precursor in a coating solution in which a dissimilar metal is dispersed, mixing the transition metal precursor with the dissimilar metal, and drying the resulting mixture so as to uniformly coat a dissimilar metal.

BEST MODE

Figure 1:
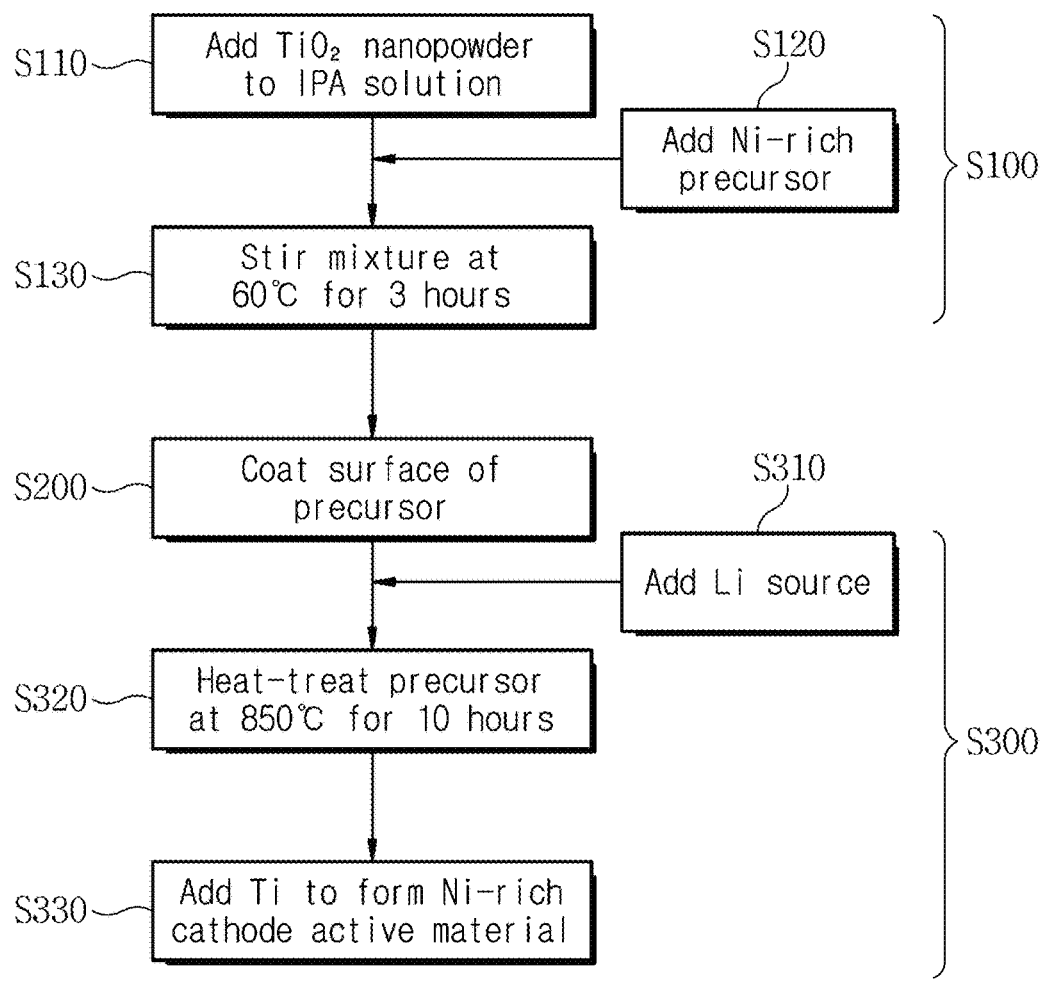
FIG. 1 is a flowchart showing a method for preparing a cathode active material for lithium secondary batteries according to one exemplary embodiment of the present invention.

The following description will be made focusing on configurations necessary for understanding embodiments of the present invention. Therefore, it should be noted that descriptions of other configurations will be omitted within a range in which the gist of the present invention is not obscured.

Terms and words used in this specification and the appended claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it should be understood that the invention covers various equivalents, modifications, and substitutions at the time of filing of this application.

Hereinafter, embodiments of the present invention will be described in further detail with reference to the accompanying drawings.

The cathode active material for lithium secondary batteries according to the present invention is a Ni-rich cathode active material represented by Chemical Formula 1 below:

$LiNi_aCo_bMn_cM_dO_2$ [Chemical Formula 1]

wherein $0.6<a\leq0.9$, $0<d\leq0.1$, $a+b+c+d=1$, and M represents at least one metal element selected from the group consisting of Ti, Al, Mg, Fe, Cu, Ag, Ca, Na, K, In, Ga, Ge, V, Mo, Nb, Si, and Zr.

As described above, the cathode active material according to the present invention is a nickel-based transition metal oxide in which a dissimilar metal M is substituted, and may be formed by coating the dissimilar metal M on a surface of a transition metal precursor including Ni, Co and Mn, and then heat-treating (calcining) the transition metal precursor together with a lithium source so that a portion of the Ni, Co and Mn is substituted with the dissimilar metal M.

Here, the transition metal precursor may be a nickel-based transition metal hydroxide or a nickel-based transition metal carbonate prepared by a coprecipitation method. For example, the transition metal precursor may be represented by Chemical Formula 2 below:

$$Ni_aCo_bMn_cO_2 \quad \text{[Chemical Formula 2]}$$

wherein 0.6<a≤0.9, and a+b+c=1.

Ti, Al, Mg, Fe, Cu, Ag, Ca, Na, K, In, Ga, Ge, V, Mo, Nb, Si or Zr may be used as the dissimilar metal M. Ti may be used in one exemplary embodiment of the present invention. A nanosized Ti oxide or a precursor thereof may be used as a Ti source.

In the cathode active material according to the present invention, the Ni content (a) may be preferably greater than or equal to 0.65, and more preferably 0.7.

54When a small amount of the dissimilar metal M is substituted in a Ni-rich cathode active material, the cathode active material according to the present invention may have improved battery properties since structural stability is provided to the Ni-rich cathode active material even when the Ni content is increased to 65% or more. That is, when a dissimilar metal M is coated on a surface of a transition metal precursor including Ni, Co and Mn, and the transition metal precursor is then heat-treated together with a lithium source so that a portion of the Ni, Co and Mn is substituted with the dissimilar metal M, the cathode active material may have improved battery properties and thermal stability under a high-temperature environment even when the Ni content in the cathode active material is increased to 65% or more.

A method for preparing a cathode active material for lithium secondary batteries according to one exemplary embodiment of the present invention will be described with reference to FIG. 1. Here, FIG. 1 is a flowchart showing a method for preparing a cathode active material for lithium secondary batteries according to one exemplary embodiment of the present invention.

Referring to FIG. 1, first of all, in S100, a dissimilar metal compound is coated on a surface of a transition metal precursor including Ni, Co and Mn by adding the transition metal precursor to a dissimilar metal compound coating solution and then stirring and drying the resulting mixture. Then, in S300, a cathode active material represented by Chemical Formula 1 may be prepared by heat-treating the transition metal precursor coated with the dissimilar metal compound together with a lithium source so that a portion of the Ni, Co and Mn is substituted with the dissimilar metal M.

In this case, the coating of the dissimilar metal compound in 5100 may be performed, as follows.

First, in S110, a Ti compound coating solution including at least one Ti compound selected from the group consisting of a nanosized Ti oxide and a precursor thereof is prepared. For example, a TiO$_2$ nanopowder is added to a solvent such as isopropyl alcohol (IPA), and then stirred to prepare a Ti compound coating solution in which TiO$_2$ is uniformly dispersed. In this embodiment, a nanosized Ti oxide is used as the dissimilar metal compound. The content of the Ti compound may be in a range of 0.1 to 5% by weight, based on the weight of the transition metal precursor.

Next, in S120, a transition metal precursor may be added to the Ti compound coating solution. In S130, the resulting mixture may then be stirred and dried at 60° C. for 3 hours to coat the Ti compound on a surface of the transition metal precursor in accordance with S200. Here, the transition metal precursor may be a nickel-based transition metal hydroxide or a nickel-based transition metal carbonate prepared by a coprecipitation method. The Ni content in the transition metal precursor may be greater than or equal to 0.65.

A process of substituting Ti as the dissimilar metal M in S300 will be described as follows.

First, in S310, a lithium source is added to the transition metal precursor coated with the Ti compound.

Next, in S320, a mixture including the lithium source and the transition metal precursor coated with the Ti compound may be heat-treated at 850° C. for 10 hours to prepare a Ni-rich cathode active material to which Ti is added (substituted) according to this embodiment (S330). That is, a portion of the Ni, Co and Mn is substituted with Ti during a heat treatment process to prepare a cathode active material represented by Chemical Formula 1.

To evaluate physical properties and electrochemical performance of such a cathode active material according to the present invention, cathode active materials of Examples 1 and 2 and Comparative Example 1 are prepared.

EXAMPLE 1

As a transition metal precursor, a nickel-based transition metal hydroxide precursor having a composition of Ni$_{0.7}$Co$_{0.15}$Mn$_{0.15}$(OH)$_2$ prepared by a coprecipitation method was used as a basic material. A TiO$_2$ powder in the form of nanoparticles was used as a Ti source to coat a Ti compound on a surface of the nickel-based transition metal hydroxide precursor.

To coat the Ti compound, the nickel-based transition metal hydroxide precursor was added to a coating solution in which 1% by weight of the TiO$_2$ powder was dispersed in IPA based on the weight (10 g) of the nickel-based transition metal hydroxide precursor, and then stirred at 60° C. for 3 hours. During this process, IPA may be removed by evaporation, and TiO$_2$ may be adsorbed onto a surface of the nickel-based transition metal hydroxide precursor to obtain the coated precursor.

The Ti-coated precursor thus prepared was mixed with a lithium source, and heat-treated to prepare a Ti-substituted cathode active material of Example 1. In this case, lithium carbonate (Li$_2$CO$_3$) was used as the lithium source in the process of preparing a cathode active material, and a ratio (Li/Me) of the lithium source to the transition metal was 1.05. The heat treatment was performed at 850° C. for 10 hours under an oxygen atmosphere using a tube furnace.

EXAMPLE 2

A Ti-substituted cathode active material of Example 2 was prepared in the same manner as in Example 1, except that 2% by weight of the TiO$_2$ powder was used, based on the weight (10 g) of the nickel-based transition metal hydroxide precursor, to coat the Ti compound.

COMPARATIVE EXAMPLE 1

A cathode active material of Comparative Example 1 in which Ti was not substituted was prepared in the same manner as in Example 1, except that a process of coating the Ti compound was omitted. That is, a nickel-based transition metal hydroxide precursor having a composition of Ni$_{0.7}$Co$_{0.15}$Mn$_{0.15}$(OH)$_2$ prepared by a coprecipitation method was heat-treated to prepare a cathode active material of Comparative Example 1.

Figure 2:
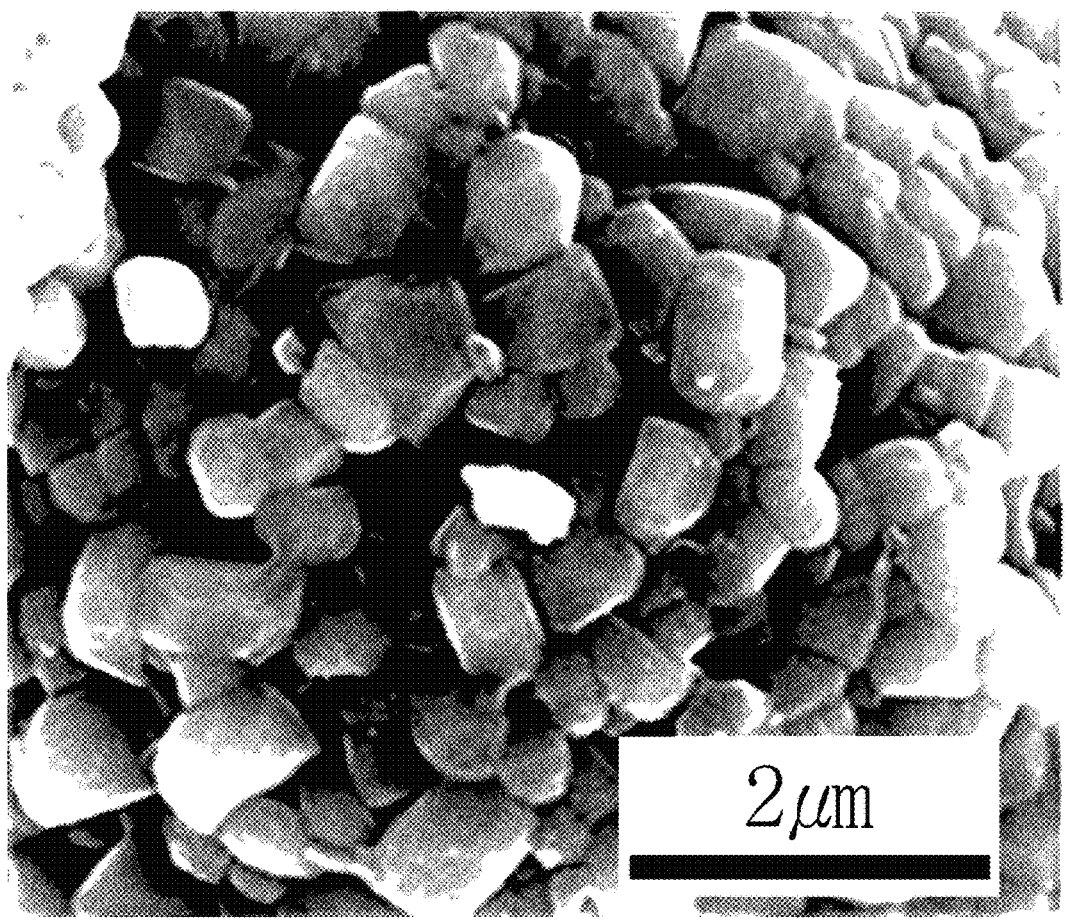
FIGS. 2 to 4 are scanning electron microscope (SEM) images of cathode active materials according to Comparative Example 1 and Examples 1 and 2.
Figure 3:
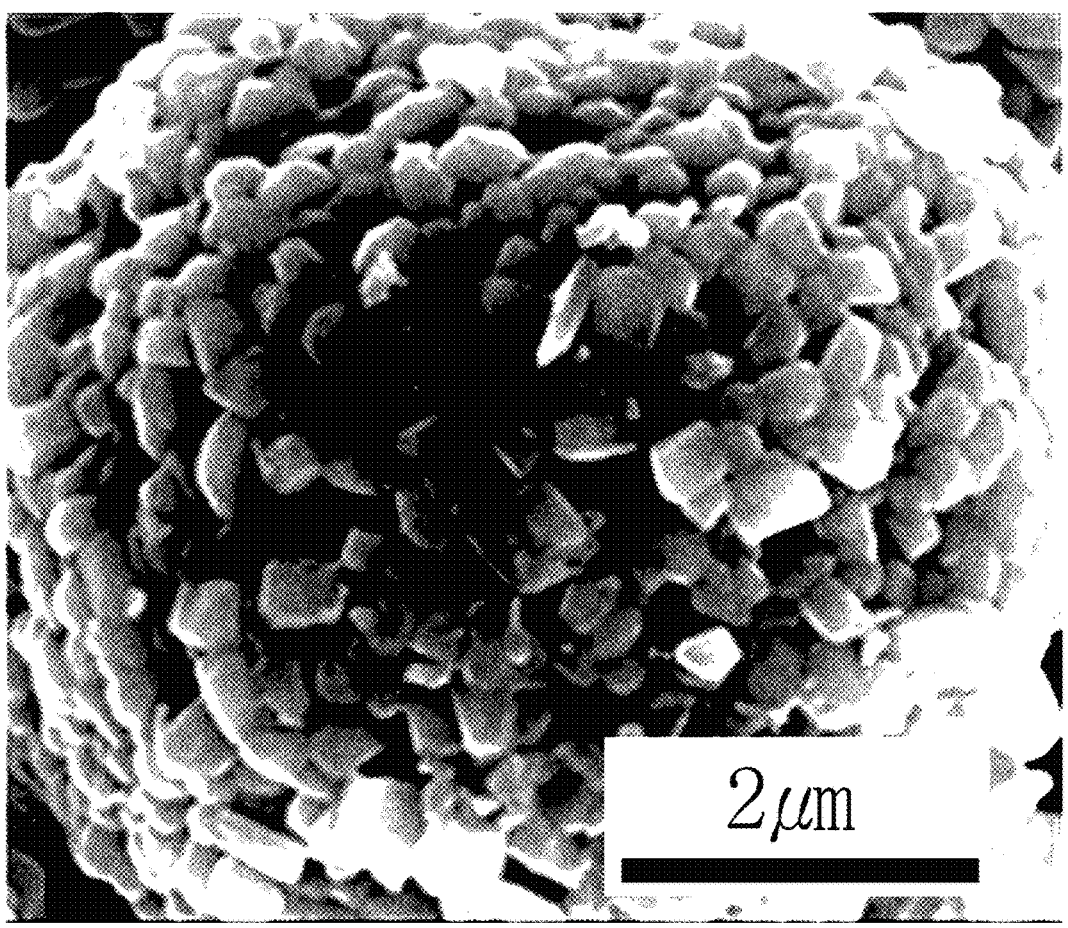
Figure 4:
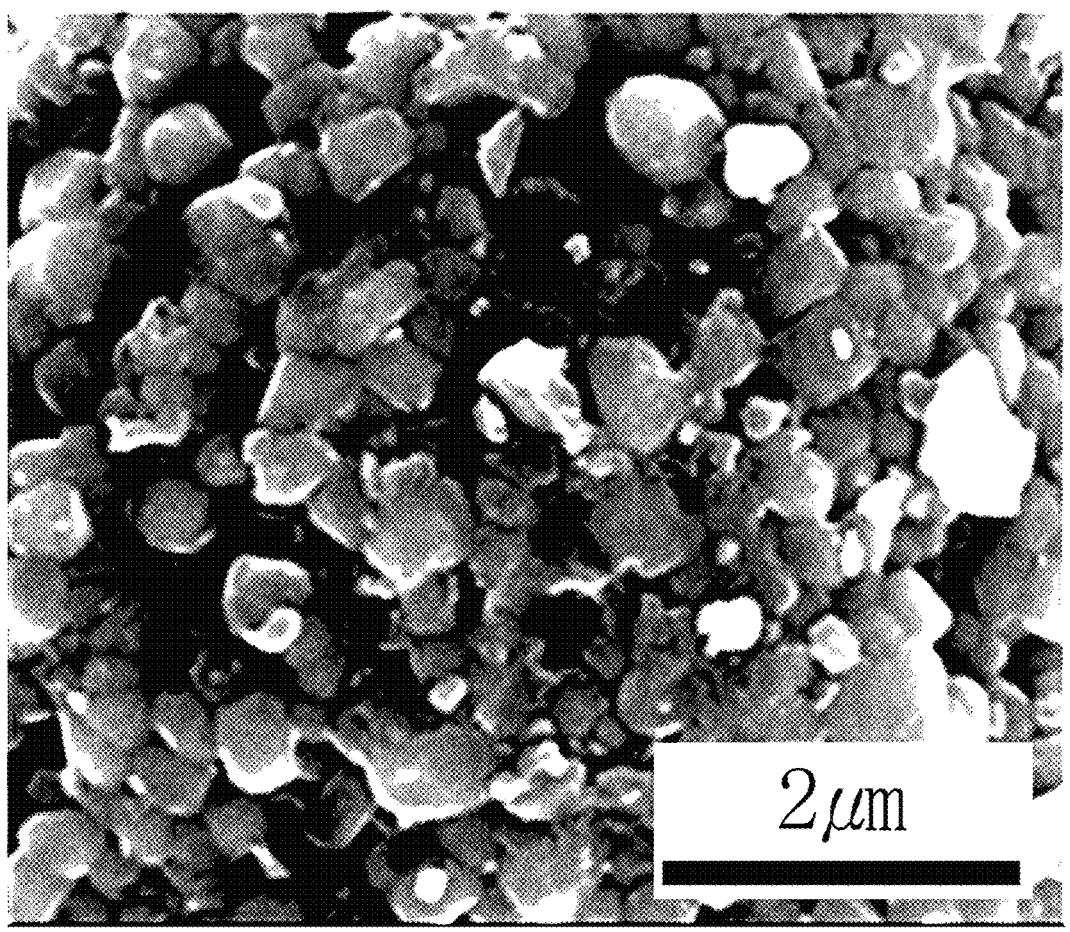

FIGS. 2 to 4 are SEM images of the cathode active materials according to Comparative Example 1 and Examples 1 and 2.

Referring to FIGS. 2 to 4, it could be seen that the cathode active materials exhibited the same particle surface, regardless of the coating of the Ti compound. From these results, it could be seen that, even when the cathode active material was prepared using the precursor coated with the Ti compound, the Ti compound was substituted and migrated into the cathode active material, but was not present on a particle surface of the cathode active material.

Figure 5:
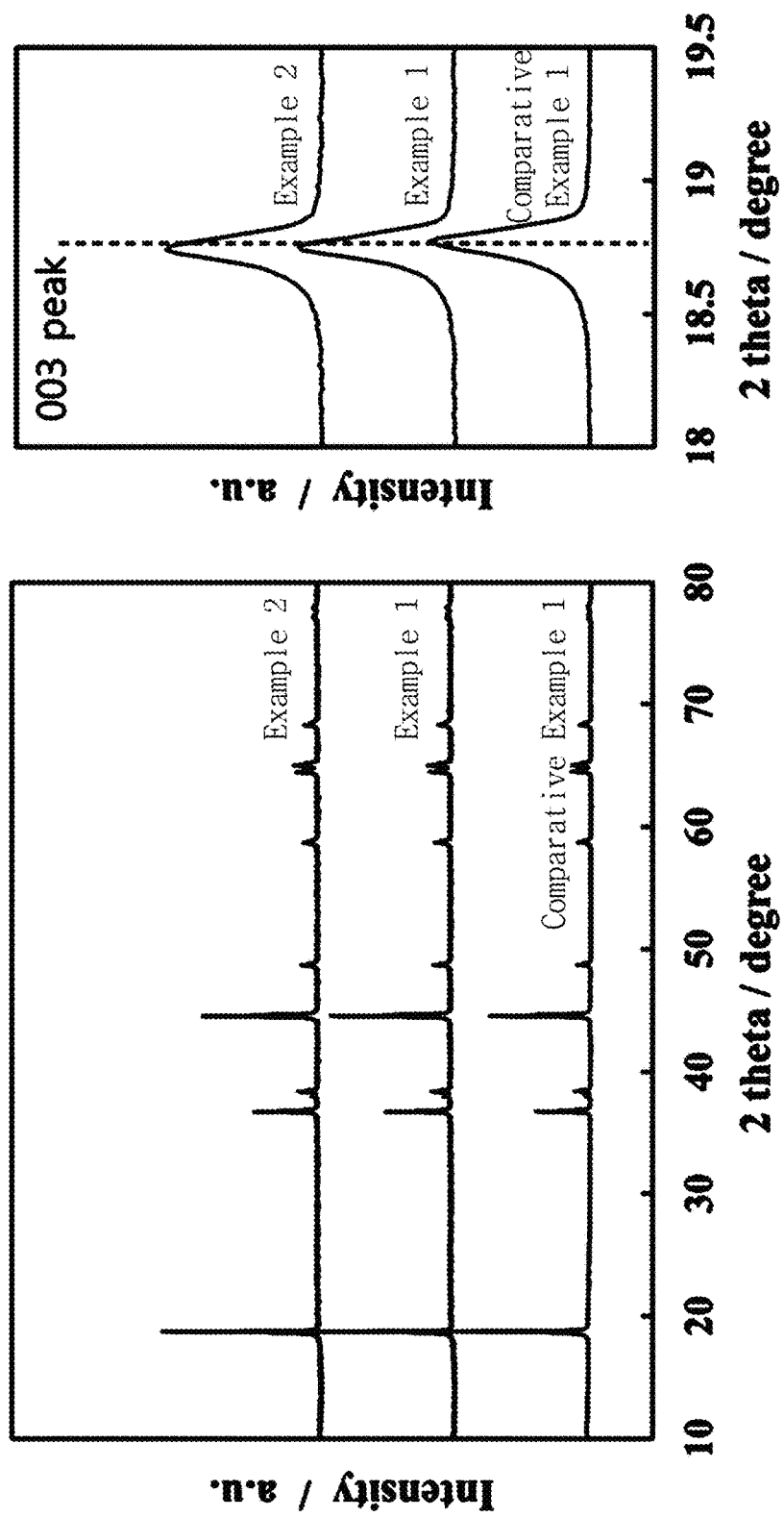
FIG. 5 is a graph illustrating X-ray diffraction (XRD) patterns of the cathode active materials according to Comparative Example 1 and Examples 1 and 2.

FIG. 5 is a graph illustrating XRD patterns of the cathode active materials according to Comparative Example 1 and Examples 1 and 2. Table 1 lists 003 peaks according to an increase in an amount of substituted Ti.

TABLE 1

|  | 003 peak (2 theta/degree) |
| --- | --- |
| Comparative Example 1 | 18.77 |
| Example 1 | 18.75 |
| Example 2 | 18.74 |

Referring to FIG. 5, it could be seen that a c-axis expansion occurred as a position of a 003 peak moved to a lower angle due to an increase in an amount of substituted Ti. It was assumed that $Ti^{4+}$ having a large ionic radius was substituted.

Figure 6:
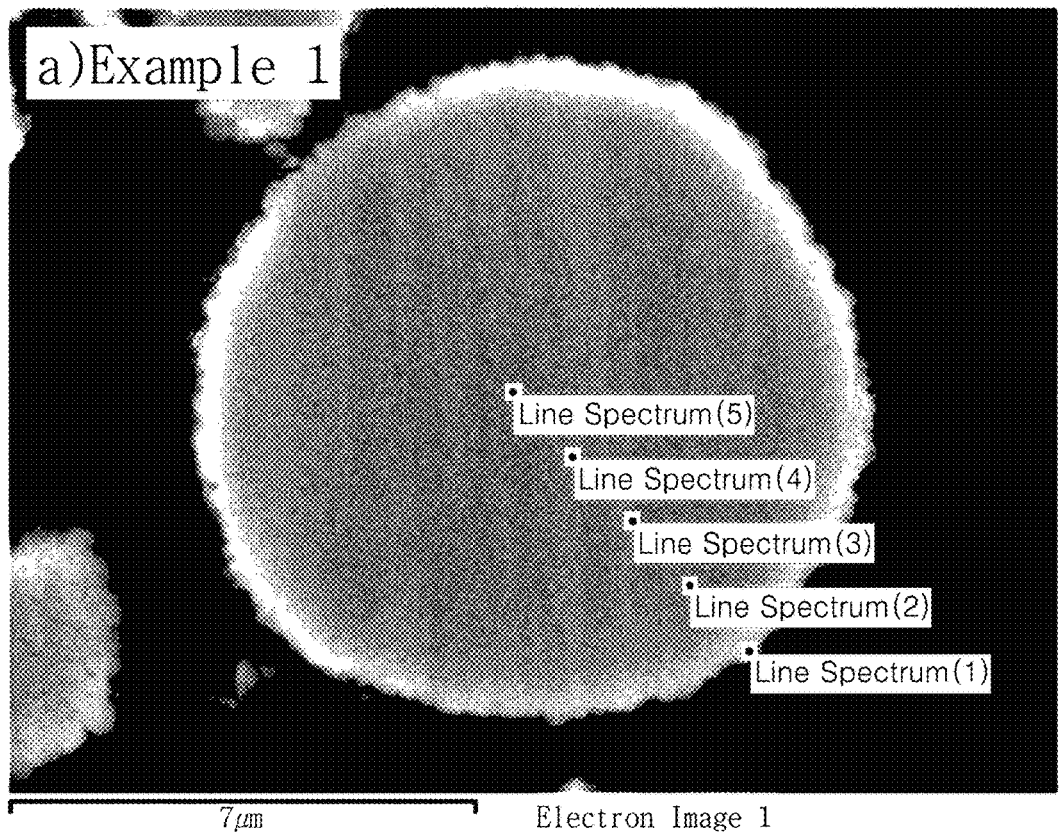
FIGS. 6 and 7 are SEM images of the cathode active materials according to Examples 1 and 2, and diagrams showing energy dispersive spectroscopy (EDS) linear mapping results.
Figure 7:
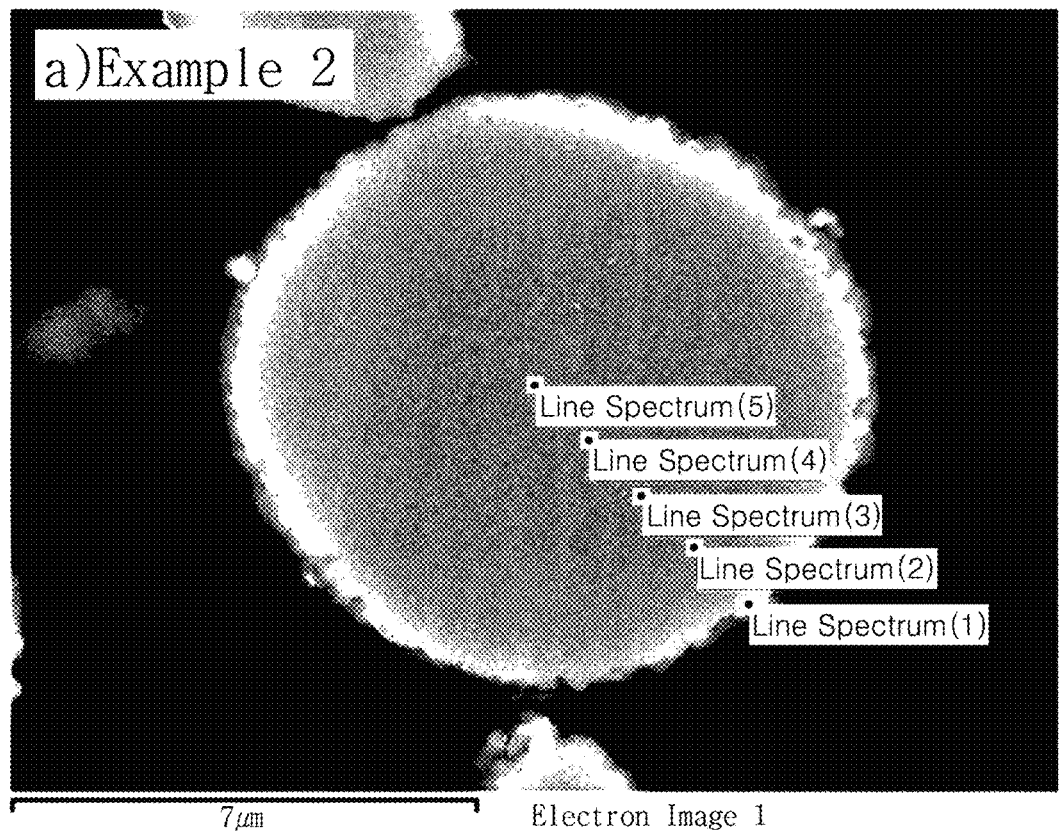

To determine whether Ti was substituted in the insides of the cathode active materials prepared in Examples 1 and 2, a test sample having a particle cross-section was prepared to perform cross-sectional EDS measurements. FIGS. 6 and 7 are SEM images of the cathode active materials according to Examples 1 and 2, and diagrams showing energy dispersive spectroscopy (EDS) linear mapping results. Tables 2 and 3 list chemical composition results of the cathode active materials of Examples 1 and 2 obtained by EDS analysis. Here, the results were obtained by performing compositional analyses from the particle surface (Line 1) to the particle center (Line 5) of the cathode active material.

TABLE 2

|  | Ni | Co | Mn | Ti | Total |
| --- | --- | --- | --- | --- | --- |
| Line 1 | 70.81 | 15.80 | 12.91 | 0.48 | 100 |
| Line 2 | 69.42 | 16.42 | 13.56 | 0.60 | 100 |
| Line 3 | 69.50 | 15.53 | 14.30 | 0.67 | 100 |
| Line 4 | 69.11 | 15.90 | 14.27 | 0.72 | 100 |
| Line 5 | 70.18 | 15.23 | 13.79 | 0.80 | 100 |

TABLE 3

|  | Ni | Co | Mn | Ti | Total |
| --- | --- | --- | --- | --- | --- |
| Line 1 | 70.48 | 14.93 | 13.19 | 1.40 | 100 |
| Line 2 | 68.82 | 15.37 | 14.12 | 1.69 | 100 |
| Line 3 | 69.03 | 15.48 | 13.81 | 1.68 | 100 |
| Line 4 | 68.28 | 15.52 | 14.27 | 1.93 | 100 |
| Line 5 | 68.96 | 15.27 | 13.96 | 1.81 | 100 |

Referring to FIGS. 6 and 7 and Tables 2 and 3, it was revealed that the Ti compound was uniformly distributed from the particle surface to the particle center. From these results, it could be seen that the cathode active materials of Examples 1 and 2 were prepared as cathode active materials in which Ti was uniformly substituted and distributed.

Based on the analysis results of the physical properties, it could be seen that Ti was uniformly substituted inside the cathode active materials prepared in Examples 1 and 2.

Lithium secondary batteries, in which the electrochemical performance of the cathode active material were able to be evaluated as follows, were prepared using the cathode active materials of Examples 1 and 2 and Comparative Example 1. Then, the battery performance of the lithium secondary batteries was evaluated.

Here, each of the lithium secondary batteries includes a cathode including a cathode active material, an anode including an anode active material enabling intercalation/deintercalation of lithium ions, a separator present between the cathode and the anode, and a non-aqueous electrolyte.

[Preparation of Lithium Secondary Battery]

For electrochemical evaluation, a lithium secondary battery was prepared using coin-type half-cells, lithium metal foil was used as a counter electrode, and the evaluation was performed at a discharge voltage of 3.0 V and a charge voltage of 4.3 V.

That is, 95% by weight of each of the cathode active materials of Examples 1 and 2 and Comparative Example 1, 2.5% by weight Denka black as a conductive material, and 2.5% by weight N-methyl pyrrolidone (NMP) as a binder were mixed in a solvent to prepare slurry. The slurry was applied onto aluminum (Al) foil having a thickness of 20 μm, dried, and then compressed using a press. Then, the Al foil was dried at 120° C. for 16 hours under a vacuum to prepare a flat circular electrode having a diameter of 16 mm.

Lithium metal foil punched with a diameter of 16 mm was used as the counter electrode, a polypropylene (PP) film was used as the separator, and a mixed solution of 1 M $LiPF_6$ including EC, DMC and DEC at a ratio of 1:2:1 (v/v) was used as the electrolyte. The separator was impregnated with the electrolyte, and the separator was inserted between a working electrode and the counter electrode. Then, a lithium secondary battery for evaluation of electrochemical properties was prepared using 2032 coin cells.

[Evaluation of Battery Performance]

Figure 8:
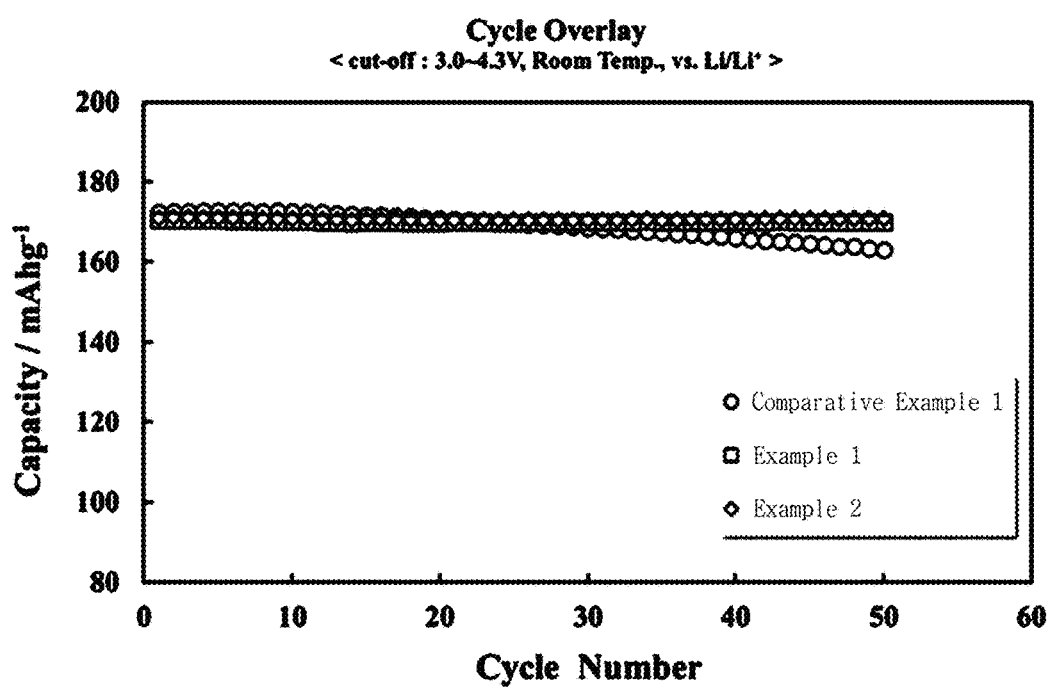
FIG. 8 is a graph illustrating room-temperature lifespan characteristics of lithium secondary batteries using the cathode active materials of Comparative Example 1 and Examples 1 and 2.

FIG. 8 is a graph illustrating room-temperature lifespan characteristics of lithium secondary batteries using the cathode active materials of Comparative Example 1 and Examples 1 and 2. Table 4 lists the room-temperature lifespan characteristics according to an increase in an amount of substituted Ti.

TABLE 4

|  | Comparative Example 1 | | Example 1 | | Example 2 | |
| --- | --- | --- | --- | --- | --- | --- |
|  | Capacity (mAh/g) | Retention rate (%) | Capacity (mAh/g) | Retention rate (%) | Capacity (mAh/g) | Retention rate (%) |
| 1 cycle | 172.3 | 100.0 | 170.4 | 100.0 | 170.9 | 100.0 |
| 10 cycles | 172.5 | 100.0 | 170.0 | 99.7 | 170.7 | 99.9 |
| 20 cycles | 170.7 | 99.1 | 169.7 | 99.6 | 170.4 | 99.7 |

TABLE 4-continued

|  | Comparative Example 1 | | Example 1 | | Example 2 | |
|---|---|---|---|---|---|---|
|  | Capacity (mAh/g) | Retention rate (%) | Capacity (mAh/g) | Retention rate (%) | Capacity (mAh/g) | Retention rate (%) |
| 30 cycles | 168.5 | 97.8 | 169.8 | 99.6 | 170.4 | 99.7 |
| 40 cycles | 166.0 | 96.3 | 170.0 | 99.7 | 170.6 | 99.8 |
| 50 cycles | 163.1 | 94.6 | 169.9 | 99.7 | 170.8 | 99.9 |

Here, the 0.5 C lifespan characteristics at room temperature (25° C.) are shown in FIG. 8, and the capacities according to an increase in cycles, and the retention rates with respect to the initial capacities are listed in Table 4.

Referring to FIG. 8 and Table 4, it could be seen that the initial capacity was 172.3 mAh/g in the case of Comparative Example 1, but the initial capacity was 170 mAh/g in the case of Examples 1 and 2 in which Ti was substituted, the value of which is slightly lower than that of Comparative Example 1. This was expected to be a phenomenon appearing due to a decrease in the Ni proportion as Ti was substituted.

However, it could be seen that the capacity retention rate after 50 cycles was 94.6% in the case of Comparative Example 1, but the capacity retention rates were 99.7% and 99.9% in the case of Examples 1 and 2, respectively, indicating that there was no loss in capacity. This indicated that the Ti substitution was effective in improving the lifespan characteristics of the Ni-rich cathode active material.

Figure 9:
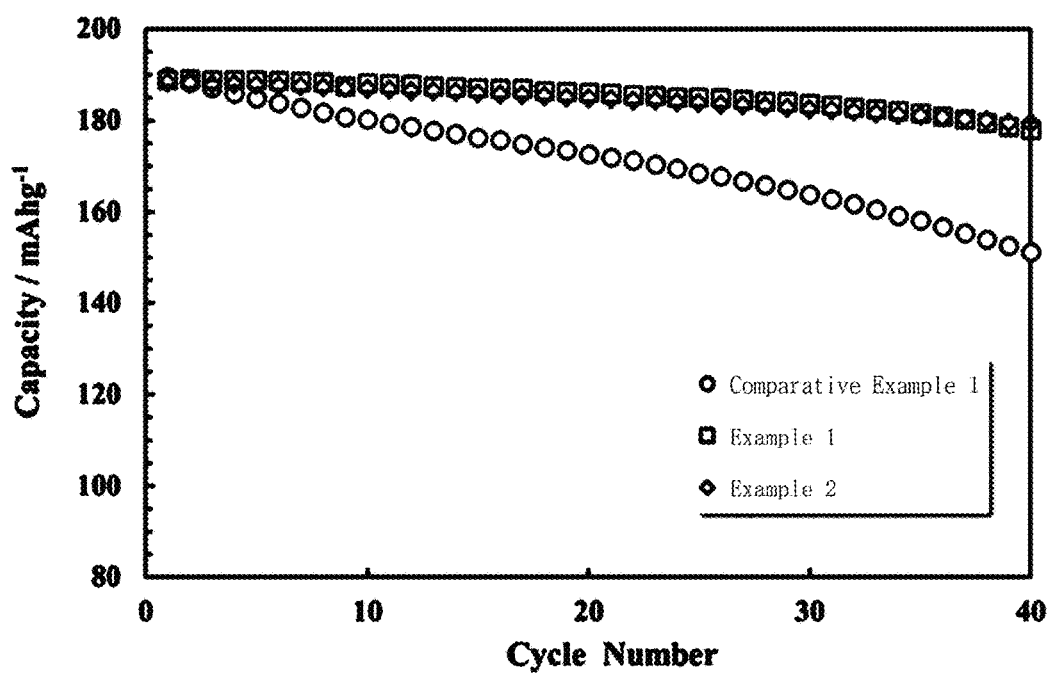
FIG. 9 is a graph illustrating high-temperature lifespan characteristics of the lithium secondary batteries using the cathode active materials of Comparative Example 1 and Examples 1 and 2.

FIG. 9 is a graph illustrating high-temperature lifespan characteristics of the lithium secondary batteries using the cathode active materials of Comparative Example 1 and Examples 1 and 2. Table 5 lists the high-temperature lifespan characteristics according to an increase in an amount of substituted Ti.

Therefore, as seen from the results of Examples 1 and 2, it could be seen that the Ti-substituted cathode active material was effectively used to improve the high-temperature lifespan characteristics.

Figure 10:
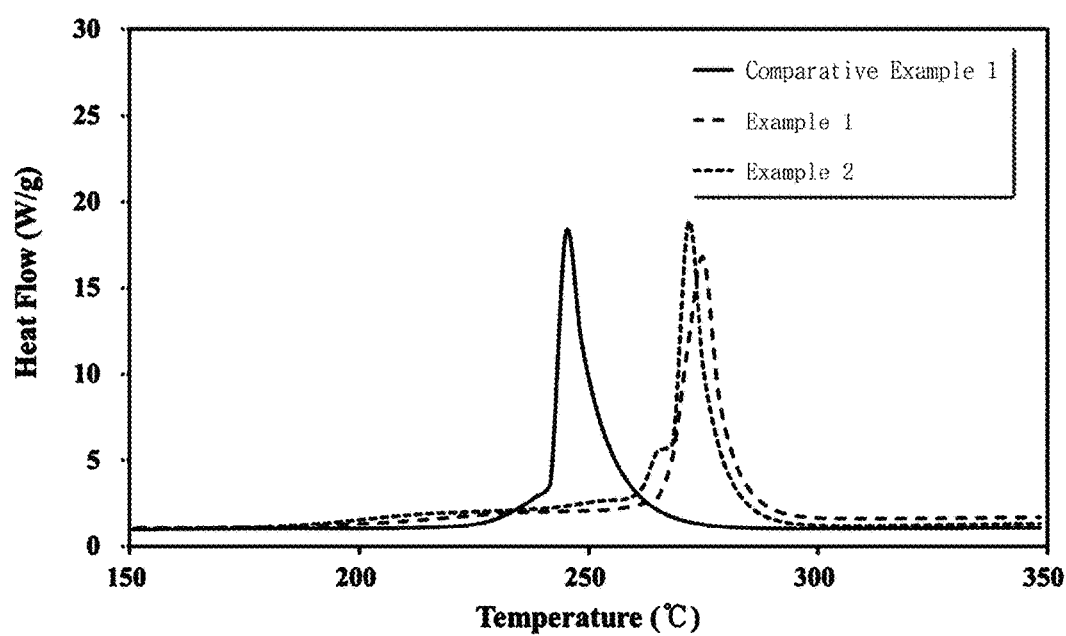
FIG. 10 is a graph illustrating results measured by DSC analysis used to evaluate thermal stabilities of the lithium secondary batteries using the cathode active materials of Comparative Example 1 and Examples 1 and 2.

FIG. 10 is a graph illustrating results measured by differential scanning calorimetry (DSC) analysis used to evaluate thermal stabilities of the lithium secondary batteries using the cathode active materials of Comparative Example 1 and Examples 1 and 2.

Referring to FIG. 10, electrodes which were in a buffered state at 4.3 V were recovered, and subjected to DSC evaluation. It could be seen that the exothermic temperature peak was observed at 235° C. in the case of Comparative Example 1. It could be seen that the exothermic temperature peaks were observed at 270° C. or more in the case of Examples 1 and 2 in which Ti was substituted, the values of which are much higher than that of Comparative Example 1.

In particular, even when the Ni content is 70% in the case of Example 1, the temperature at which the exothermic peak is observed is increased to the same level of 275° C. as the exothermic temperature peak of $LiNi_{0.6}Co_{0.2}Mn_{0.2}O_2$ in which the Ni content is 60%.

As described above, it could be seen that the cathode active materials prepared in Examples 1 and 2 had higher thermal stability, compared to the cathode active material prepared in Comparative Example 1.

TABLE 5

|  | Comparative Example 1 | | Example 1 | | Example 2 | |
|---|---|---|---|---|---|---|
|  | Capacity (mAh/g) | Retention rate (%) | Capacity (mAh/g) | Retention rate (%) | Capacity (mAh/g) | Retention rate (%) |
| 1 cycle | 189.5 | 100.0 | 188.9 | 100.0 | 188.4 | 100.0 |
| 10 cycles | 180.2 | 95.1 | 188.1 | 99.6 | 187.0 | 99.3 |
| 20 cycles | 172.1 | 90.8 | 186.1 | 98.5 | 184.9 | 98.2 |
| 30 cycles | 163.8 | 86.4 | 183.6 | 97.2 | 182.6 | 96.9 |
| 40 cycles | 151.3 | 79.8 | 177.9 | 94.2 | 179.4 | 95.3 |

Here, the 0.5 C lifespan characteristics at a high temperature (60° C.) are shown in FIG. 9, and the capacities according to an increase in cycles, and the retention rates with respect to the initial capacities are listed in Table 5.

Referring to FIG. 9 and Table 5, it was confirmed that the capacity was in a range of 188 to 189 mAh/g in the case of Comparative Example 1 and Examples 1 and 2, indicating that there was no huge difference in the initial capacity.

However, it could be seen that the capacity retention rate was highly reduced with an increase in cycles in the case of Comparative Example 1 in which Ti was not substituted. It could be seen that the capacity retention rate after 40 cycles was 79.8% in the case of Comparative Example 1, but the capacity retention rates were 94.2% and 95.3%, respectively, in the case of Examples 1 and 2 in which Ti was substituted, the values of which are higher than that of Comparative Example 1.

The embodiments disclosed in this specification and shown in the drawings are only examples to aid in understanding the present invention, but are not intended to limit the scope of the present invention. It will be apparent to those skilled in the art to which the present invention belongs that various modifications can be made based on the technical scope of the invention in addition to the embodiments disclosed herein.

What is claimed is:

1. A cathode active material for lithium secondary batteries which is represented by Chemical Formula 1 below and is obtained by coating a dissimilar metal (M) on a surface of a transition metal precursor comprising Ni, Co and Mn and then heat-treating the transition metal precursor together with a lithium source so that a portion of Ni, Co and Mn is substituted with the dissimilar metal (M):

$$LiNi_aCo_bMn_cM_dO_2 \quad \text{[Chemical Formula 1]}$$

wherein 0.65≤a ≤0.7, 0<d ≤0.1, a+b+c+d=1, and M is Ti.

2. The cathode active material of claim 1, wherein the transition metal precursor comprises a nickel-based transition metal hydroxide or a nickel-based transition metal carbonate prepared by a coprecipitation method.

3. The cathode active material of claim 1, wherein the content (a) of Ni in Chemical Formula 1 is equal to 0.7.

4. A lithium secondary battery comprising a cathode active material which is represented by Chemical Formula 1 below and is obtained by coating a dissimilar metal (M) on a surface of a transition metal precursor comprising Ni, Co and Mn and then heat-treating the transition metal precursor together with a lithium source so that a portion of Ni, Co and Mn is substituted with the dissimilar metal (M):

$$LiNi_aCo_bMn_cM_dO_2 \quad \text{[Chemical Formula 1]}$$

wherein $0.65 \le a \le 0.7$, $0 < d \le 0.1$, $a+b+c+d=1$, and M is Ti.

5. The lithium secondary battery of claim 4, wherein the cathode active material has an exothermic temperature peak observed at 275° C. or more, as evaluated by differential scanning calorimetry (DSC) when the lithium secondary battery is charged to 4.3 V.

6. The lithium secondary battery of claim 4, wherein the content (a) of Ni in Chemical Formula 1 is equal to 0.7.

7. A method for preparing a cathode active material for lithium secondary batteries, comprising:

coating a dissimilar metal compound on a surface of a transition metal precursor including Ni, Co and Mn by adding the transition metal precursor to a dissimilar metal (M) compound coating solution and stirring and drying the resulting mixture; wherein the coating comprises preparing a Ti compound,coating solution comprising one or more Ti compounds selected from the group consisting of a nanosized Ti oxide and a precursor thereof; and coating the Ti compound on a surface of the transition metal precursor by adding the transition metal precursor to the Ti compound coating solution and stirring and drying the resulting mixture, and preparing a cathode active material represented by Chemical Formula 1 below by heat-treating the transition metal precursor coated with the dissimilar metal compound together with a lithium source so that a portion of Ni, Co and Mn is substituted with the dissimilar metal (M):

$$LiNi_aCo_bMn_cM_dO_2 \quad \text{[Chemical Formula 1]}$$

wherein $0.65 \le a \le 0.7$, $0 < d \le 0.1$, $a+b+c+d=1$, and M is Ti.

8. The method of claim 7, wherein the transition metal precursor comprises a nickel-based transition metal hydroxide or a nickel-based transition metal carbonate prepared by a coprecipitation method.

9. The method of claim 7, wherein the Ti compound is included at a content of 0.1 to 5% by weight, based on the weight of the transition metal precursor.

10. The method of claim 7, wherein the transition metal precursor is represented by Chemical Formula 2 below:

$$Ni_aCo_bMn_cO_2 \quad \text{[Chemical Formula 2]}$$

wherein $0.65 \le a \le 0.7$, and $a+b+c=1$.

* * * * *